United States Patent
Zomer et al.

(10) Patent No.: US 7,156,581 B2
(45) Date of Patent: Jan. 2, 2007

(54) DYNAMIC REMEDIATION OF SOIL AND GROUNDWATER

(76) Inventors: Patrick W. Zomer, 2054 Spicers La., Woodstock, GA (US) 30189; Eric J. Macking, 2180 Garland Mountain Trail, Waleska, GA (US) 30183

( * ) Notice: Subject to any disclaimer, the term of this patent is extended or adjusted under 35 U.S.C. 154(b) by 0 days.

(21) Appl. No.: 10/881,670

(22) Filed: Jun. 30, 2004

(65) Prior Publication Data

US 2004/0265064 A1 Dec. 30, 2004

Related U.S. Application Data

(60) Provisional application No. 60/483,717, filed on Jun. 30, 2003.

(51) Int. Cl.
*B09C 1/00* (2006.01)
(52) U.S. Cl. .................. 405/128.1; 405/128.7
(58) Field of Classification Search ............ 405/128.1, 405/128.7, 128.75, 129.5
See application file for complete search history.

(56) References Cited

U.S. PATENT DOCUMENTS

| | | | | |
|---|---|---|---|---|
| 5,433,829 A * | 7/1995 | Pool | ................. | 205/766 |
| 5,833,855 A * | 11/1998 | Saunders | ................ | 210/611 |
| 5,885,203 A * | 3/1999 | Pelletier | ................. | 588/249 |
| 6,295,761 B1 * | 10/2001 | Weder | ................. | 47/72 |
| 6,432,216 B1 * | 8/2002 | Thies | ................. | 134/18 |

OTHER PUBLICATIONS

Process/industrial instruments and controls handbook / Gregory K.☐☐McMillan. editor, 1999, McGraw-Hill Companies, Inc. pp. 2.1-2.29 and 10.190-10.221.*

* cited by examiner

*Primary Examiner*—John Kreck
(74) *Attorney, Agent, or Firm*—Gardner Groff Santos & Greenwald, P.C.

(57) ABSTRACT

A method and system for improved environmental remediation. A method comprising establishing an initial remediation protocol; applying at least one initial motive force according to the initial remediation protocol; monitoring the effect on the site resulting from the application of the at least one initial motive force; modifying the remediation protocol to improve the performance of the remediation using information gleaned from the monitoring of the site; applying at least one motive force according to the modified remediation protocol; and repeating monitoring, modifying, and applying in a more or less continuous fashion until the remediation is complete.

11 Claims, 4 Drawing Sheets

DYNAMIC REMEDIATION OF SOIL AND GROUNDWATER

CROSS REFERENCE TO RELATED APPLICATION

This application claims priority to U.S. Provisional Application No. 60/483,717, filed Jun. 30, 2003, hereby incorporated by reference in its entirety.

FIELD OF THE INVENTION

The present invention relates generally to the field of environmental remediation and, more specifically, relates to improving the process of environmental soil and groundwater remediation.

BACKGROUND OF THE INVENTION

A variety of methods involving the application of a motive force have been developed to remediate various types of soil and groundwater contamination of regulated materials. In the environmental remediation industry there is generally a lack of predictability in site remediation because subsurface soil and groundwater conditions are often heterogeneous and the delivery mechanisms for the motive forces are not efficient enough to overcome the heterogeneous conditions in a cost-effective manner. Current remediation processes are inefficient and somewhat ineffectual in some instances.

Most environmental cleanup activities are regulated by a government agency, such as a local, state, or federal environmental agency. A typical sequence of an environmental cleanup project involves several steps:
1. Assessing the environmental damage;
2. Establishing an initial pilot remediation protocol (approach, plan or technique);
3. Performing the pilot remediation according to the pilot protocol for a limited time or to a limited extent;
4. Monitoring the pilot remediation results;
5. Establishing a final remediation protocol based on the results of the pilot program;
6. Performing the final remediation over an extended period of time in a static manner (without changing or updating the protocol); and
7. Monitoring the impact of the final remediation over time to evaluate whether the final remediation needs be continued or is in fact completed.

These seven steps can be categorized in four major categories: assessment; pilot testing; remediation; and monitoring. Regulatory approval for implementing these phases of cleanup is generally required throughout the entire life of the project. The assessment phase (phase 1) consists of determining the rate and extent of contamination in soil, groundwater, and other media impacted by the release. In this phase, soil and groundwater is sampled and analyzed by a laboratory for constituents related to the released material. The released material can dissolve in water passing through soil and absorb to the soil above the water table or it can absorb to the soil above the water table in its natural state (free product). Similarly, groundwater within or beneath the location(s) of the release(s) can also contain dissolved and/or free product resulting from the release.

Drilling methods are utilized in this assessment phase to collect soil samples and to drill monitoring wells. Monitoring wells are used to sample groundwater and determine how far groundwater contamination has traveled in the groundwater. In addition, the groundwater elevations are determined to interpret the direction of groundwater flow. Additional hydrogeologic characteristics are determined in an attempt to predict the velocity of groundwater flow and to provide data to be used in the pilot testing and remediation phases of the project.

Following the assessment phase, enough information usually is known to select a remediation technique (protocol) that might be suitable for mitigating the damage. The remediation protocol often involves the application of a motive force to the subsurface of the ground (active remediation). Remediation can also involve physical removal of the contaminated media and disposal and/or treatment of the removed media above the subsurface (ex situ remediation). In the case of active, in situ remediation, the technique, protocol, or approach typically is tested via a small-scale pilot test that helps to determine the appropriate spacing between remediation wells and the appropriate sizing for the major remediation equipment to be utilized (sources of motive force). Monitoring occurs throughout the life of the remediation period and sometimes after the remediation is completed to ensure compliance with applicable cleanup standards. Monitoring generally consists of sampling soil and groundwater to demonstrate whether the soil and groundwater meet applicable regulatory requirements. Groundwater is generally collected from permanent monitoring wells.

These monitoring wells are installed by creating a hole (borehole) in the ground using a drill rig. A well is constructed within the borehole using a slotted well casing connected to a solid riser. A typical monitoring well construction consists of one screened interval that spans the water table in a desired vertical position to evaluate groundwater for the contaminants of concern. Sand is typically installed in the annular space (between the well casing and the wall of the borehole) to a depth slightly higher than the top of the slotted screen. The column of the sand in the annular space of the borehole is known as a sand pack. A seal is then used to prevent surface water or potential contaminants from entering the sand pack. The seal is generally constructed using bentonite, which is a cohesive clay material. The bentonite seal is installed above the sand pack. A grout consisting of a bentonite and cement mixture is used above the seal to further seal the top of the well.

Remediation wells are used to apply motive forces to remediate contaminated subsurface media. Remediation wells typically are constructed for the purpose of extracting gases or liquids from the subsurface or injecting gases or liquids into the subsurface. A network of remediation wells generally is used to impact the subsurface in a manner that reduces the contamination in the subsurface, as measured in monitoring wells that are sampled on a regular basis (usually quarterly or less frequently). An extraction well is constructed generally similarly to a monitoring well; however, the screen length is varied and the diameter of the wells and construction of the sand pack are varied in an attempt to improve the efficiency of removal of contaminated groundwater and vapors liberated from soil that has been influenced by the extraction. An injection well is generally constructed similar to a monitoring well except that the entire screen is submerged below the water table and the bentonite seal functions as a barrier to prevent injected materials from coming up the borehole, thereby allowing injected material to release more effectively to the subsurface. For injection of a gas, the top of the screen is generally installed below the contamination to allow the injected gases to transfer the contamination from a dissolved state to a gaseous state.

Extraction wells may be used to recover the vapors from this process. Alternatively, injection of gases can be used to remediate contaminated soil above the water table. Liquid injection is generally used to allow chemical or biological processes to occur to remediate contaminated soil or groundwater. Until approximately 1995, these injection processes were generally implemented in open boreholes rather than in permanent remediation wells. Currently, the screened intervals for these injection processes are variable depending on the distribution of contaminated media that are targeted for remediation.

Prior to the installation of a permanent remediation well network and system, pilot testing is often conducted to assess the viability of a remediation protocol or technology (ies). During a pilot test, a remediation protocol (usually utilizing motive forces) is applied to a remediation well and observation wells are utilized to monitor the response of the applied motive force. The primary types of response usually measured during the pilot test are properties of the subsurface, influence (differential pressure) of the motive force on the observation wells, and the amount of mass contaminants removed. Traditionally, pilot tests are only performed one time in one part of a site. Therefore, effects of changing conditions can only be assumed or calculated based on currently available models. Also, heterogeneities in the subsurface make models far less predictable. A change in process that allows iterative and flexible techniques to be implemented throughout remediation is required.

Following completion of the pilot test, a design for the remediation well network and system is completed. The layout of the remediation wells and spacing between the wells is generally based on knowledge of the subsurface conditions and the response measured during the pilot phase. The criteria for spacing between wells and the design criteria for delivery of the motive force are based on research provided in the industry. The sources of motive forces are designed to deliver the appropriate amount of motive force to bring the contaminated soil and groundwater into compliance with appropriate regulatory standards. Upon completion of the design, plans are submitted to the environmental agency regulating the release. Upon approval by the regulating agency, the construction of the remediation system begins, including the installation of remediation wells, piping from the remediation well network to the location of the motive forces, and the fabrication of a motive force delivery system and controls for continuous operation of a system.

The remediation system may be designed to operate motive forces over the entire contaminated area at one time. Alternatively, manifolding of the piping can be completed so that motive forces can be applied to portions of the contaminated subsurface in a predetermined or programmable sequence. The construction sequence generally consists of the installation of the wells and associated piping first, followed by the fabrication of the motive force delivery system and controls, which is usually conducted off site. Upon completion of the construction process, the motive force delivery system and controls are delivered to the site and the system is started. Regular maintenance activities are conducted after the system startup.

One prevailing or widespread approach to the design of the remediation protocol is to try to accomplish the remediation with as few remediation wells, motive forces, and controls as possible in an attempt to minimize costs. To accomplish the remediation with very few wells it is generally regarded that the time required to complete the remediation of the site will be longer. The increased timeline results in higher operation and maintenance, sampling, and reporting costs. Also, once the remediation wells are installed there is not an easy way to modify the well network by adding more or different types of wells, if the data related to subsurface conditions and containment recovery warrant modifications.

The two most common broad types of motive forces for remediation are injection of liquids or gases into the subsurface and extraction of liquid or gases from the subsurface to cause reduction of contamination. The reduction of contamination may be obtained through mechanical, chemical, biological, and other processes that occur as a result of the injection or extraction motive forces. The delivery of the motive forces is often controlled with programmable logic controllers. The logic controller is generally programmed to adjust the motive forces based on conditions within the source of the motive delivery system, rather than based on conditions in the subsurface of the ground. For example, temperature sensors within the sources of the motive force may shut down the system when the operating temperature of the equipment becomes too high (e.g., to avoid damaging the motor). Other safety issues may be utilized including shutoffs when explosive conditions are present in the remediation compound area. Controls also are used to operate motive forces at different areas of the site in a preprogrammed sequence.

Currently, common indicators of remediation success are usually collected no more frequently than monthly or quarterly. Therefore, the need for significant operational changes are often identified over an extended period of time, adding to the remediation costs. Current industry practice does not use real-time data indicative of remediation success or failure in the programmable logic controller in a manner that results in effective, automatic system adjustments that maximize remediation efficiency or minimize undesirable effects of system operation. Also, there is not a method in the industry for easily changing motive forces to easily take advantage of the most appropriate motive force as the nature and extent of contamination changes or as subsurface conditions change throughout the life of an environmental remediation project.

Currently, prior art remediation often includes permanent wells at depths that span the contaminated areas and are used to monitor the influence that the motive force is having on the subsurface during soil and groundwater remediation. Currently, the wells typically are only capable of measuring influence at the wellhead, which does not provide an indication of where within the vertical column of the subsurface is being influenced by the motive force. It is only known that the influence is observed somewhere in the screened area of the well. The significance of not understanding vertically where the influence is being observed is that it is unknown whether or not the entire vertical column of contaminated subsurface is being treated. A process is needed to better monitor the success of remediation at varying vertical positions.

Much theoretical information has been published about the distribution of forces in the subsurface and the vertical profile of the groundwater surface that is influenced by applied motive forces. Generally, for a remediation well installed near the top of the groundwater surface typically the impact of the motive force is most prominent above the water table, because the soil above the water table contains air in void spaces, which is much less resistant than water. However, in a scenario where free product or contaminant dissolved constituents are present in groundwater, a larger vertical column requires influence below the groundwater surface to effectively remediate the release. During injection and extraction the entire vertical column of contaminated subsurface, particularly between remediation wells that apply the motive forces, is not always influenced by the particular motive force, making remediation of these areas incomplete or reliant upon natural remediation mechanisms of volatilization, biodegradation, advection, and other phenomena. Traditional remediation wells often only deliver motive force from/to one depth within the subsurface per location, thereby decreasing the likelihood of being able to influence a large vertical column of contaminated subsurface and decreasing the likelihood of intentionally influencing specific areas requiring remediation.

In a typical prior art remediation scenario, when a mechanical motive force is applied, contaminants are removed at a greater rate near the beginning of the application, and the removal rate decreases relatively quickly as an equilibrium condition occurs in the subsurface, thus a diminishing return is generally observed during the application of the motive force. Currently, the industry has utilized sequencing when applying motive forces, in other words, turning off motive force in portions of the remediation area or the entire remediation area. This method allows conditions to return to a static condition during the period of inactivity and in the short term it allows the ability to remove or treat a larger mass of contaminant when the motive force is reapplied. However, after repetition of the cycling of motive forces on and off, the mass removal reaches an equilibrium state faster with each cycle. The traditional explanation for this trend is that the overall mass of contaminant in the subsurface is decreasing thereby reducing the mass available for extraction. While this explanation is not totally unsound, a distinction must be made. The distinction is that the mass within the flowpaths of the applied motive forces is decreased and the mass available within the flowpaths is reduced. Therefore, a method of maximizing the mass removal of contaminants would be to change flowpaths when an equilibrium condition exists, thereby keeping subsurface flows in a dynamic state longer and allowing treatment of contaminants at varying horizontal and vertical locations within the contaminated areas. A method is needed to detect the equilibrium conditions and change the flowpaths by adjusting a given applied motive force or changing the type of motive force at varying horizontal and vertical positions to maximize contaminant removal.

Throughout the remediation process, undesirable effects can be created by the application of motive forces which can result in longer remediation time frames. Examples of undesirable effects would be creation of pore size preferential pathways, uncontrolled generation of vapors due to vapor injection, undesirable by-product generation due to chemical processes, and undesired movement of contaminated groundwater plume away from the source area. Current industry practice is to attempt to design for these undesirable effects prior to starting the system. However, the nature and extent of these undesirable effects cannot always be predicted and currently there is not a functional method for detecting some undesirable effects that develop after the system is started. A method is needed for detecting undesirable effects after system startup and correcting system operation without significant design changes.

There is currently not a method of easily changing technologies/motive forces at contaminated sites without having to make significant and costly changes to the remediation system components. For example, different technologies are needed at different times within a remediation project. Soil remediation techniques often involve a different motive force application than groundwater remediation. Also, free product in groundwater may be removed more efficiently and cost effectively via different technologies than dissolved contamination. Also, changes in subsurface conditions (chemical, physical, biological, or other) often necessitate that different techniques/technologies be applied. The result of changing technologies is that specific well designs, well spacing, piping, and major system components have to be changed, which can be cost prohibitive. A universal cost effective method is needed to allow for changing remediation technologies as conditions related to the nature and extent of contamination change.

In summary, the existing prior art for groundwater remediation does not allow for ease of monitoring data and controls that could enhance the ability to measure remediation effectiveness at the appropriate horizontal and vertical positions within the subsurface. Monitoring data and controls are needed that more adequately measure the effectiveness of the delivery of motive forces and adjust the motive force based on real time monitoring data to maximize remediation effectiveness and minimize undesirable effects. Further, utilization of a more efficient infrastructure that allow for ease in combining technologies and changing technologies can improve the overall remediation process.

The current methodology of the industry uses "brute force" without the use of any feedback from the operation of the remediation system as to how it is performing in effecting the clean up or even whether the selected system uses the appropriate technology. Accordingly, it can be seen that there is yet a need in the art for a method and apparatus for providing soil and groundwater remediation which takes advantage of performance information in order to utilize the appropriate techniques and resources at the appropriate time and to optimize the remediation being performed. It is to the provision of such a remediation method and apparatus that the present invention is primarily directed.

SUMMARY OF THE INVENTION

Briefly described, in a preferred form the present invention comprises a method and apparatus for remediating soil and/or groundwater sites that have become contaminated. The invention is adaptive in the application of a remediation protocol and advantageously utilizes performance data relating to the effect and nature of the remediation taking place in the soil and/or groundwater to modify the remediation protocol and/or system to optimize the results obtained in a dynamic manner. In particular, preferably the present invention monitors the effect of the remediation protocol and modifies the protocol and/or system in a more or less continuous fashion to maximize the usefulness/effectiveness of the protocol.

Preferably, the invention involves the use of remediation wells with the system monitoring the results obtained and dynamically deciding which remediation wells should be employed (and to what extent) in order to effect the remediation of the site in a relatively quick and cost-effective manner. This is in stark contrast to the prior art arrangements which utilize few remediation wells in a wooden (fixed) manner to accomplish remediation through a series of assumptions based on limited operational data in a somewhat uninformed way. The present invention represents a substantial step forward in how remediation is accomplished.

Stated another way, the present invention comprises a remediation process utilizing a network of wells, a monitoring and data processing logic center, and a motive force delivery center/system. The invention is utilized in conjunction with existing and future remediation technologies that incorporate motive forces to treat contaminated soil and groundwater. The invention generally includes a comprehensive monitoring approach with a feedback loop that allows for adjustment of motive forces to maximize the delivery of the motive forces and allows for the minimization of undesirable effects.

Preferably, the invention utilizes a network of multi-purpose wells that allows discrete monitoring from a vertical position and application of a motive force to a vertical position within the subsurface soil or groundwater. A typical multi-purpose well includes one outer casing that is slotted to allow gases or liquids to be injected or extracted at desired vertical positions and to allow, within vertical positions of the subsurface, measurement of subsurface conditions or measurement of parameters that indicate remediation performance. For each project, the desired vertical positions at which the motive force is applied will be determined after review of geologic and hydrogeologic conditions, the distribution of the mass of contaminants to be remediated, and at the onset of motive force application. Preferably, remediation wells are installed iteratively upon collection of operational data in a manner that optimizes the well locations.

Preferably, the monitoring and data processing logic center contains measurement instruments and data loggers to measure and electronically store parameters of interest for the project. The monitoring equipment can be programmed to measure parameters either on a continuous basis or periodically on a programmed time interval. The data collected from the monitoring center is transferred into a programmable central processing unit that is linked to the motive force delivery system that comprises valving for control of the motive forces. The programming in the central processing unit is initially based on the collection of project-specific chemical, geologic, and hydrogeologic parameters via assessment, research of similar conditions, and pilot testing. Upon completion of initial and subsequent phases of remediation or at any other time, the programming can be changed to meet changing subsurface conditions or project goals. Examples of common project goals that the present invention can help meet may include better delivery of motive force to the subsurface, minimization of migration of the contamination, minimization of undesirable side effects from the remediation, and controlling factors that can potentially affect safety. Within the central processing unit, the recorded data can be compared to programmed criteria and a logic (control protocol) can be applied that will adjust the application of the motive forces or change types of motive forces as required to meet the project goals.

Preferably, the motive force delivery system comprises devices that allow the motive force to be delivered to the subsurface. The devices can include the previously described multipurpose wells, associated piping from the wells to the remediation system compound, valves, and monitoring ports. The motive force delivery system enables the control over motive forces and monitoring capability at or near the motive force, in manifolded "legs" of the system, and at individual positions. A preferable valve type is one that allows on/off control as well as being variably adjustable to adjust the valve open or closed to a desired degree.

The present invention is operative to adjust the motive force, change the type of motive force, or discontinue the use of a motive force at a given vertical position or positions based on measurements from a given position(s) that is/are indicators of undesirable effects resulting from the application of the motive force(s) at a given point or points.

The present invention can provide an infrastructure that is capable of utilizing two or more sources of motive force (active remediation), passive remediation methods, or a combination of active and passive remediation methods, with minimal changes to the network of wells, piping, or controls.

The present invention allows for utilization of geophysical tools to determine contaminant properties, geologic properties, or hydrogeologic properties for purposes of characterizing profiles of contamination to be remediated or that have been remediated.

A delivery system is provided that can utilize the monitoring data indicative of degree of influence or indicative of lack of influence in varying horizontal and vertical positions and adjust the application of motive forces at given horizontal and/or vertical positions to influence a larger or a more specific volume of the subsurface. The delivery system may include combining several additional sources of motive force to assist in maximizing effectiveness of the motive forces.

The present invention is operative to adjust the motive force, change the type of motive force, or discontinue the use of a motive force at a given vertical position or positions based on measurements from a given position(s) that is/are indicators of equilibrium conditions, where the motive force adjustment results in changing the subsurface state from equilibrium to dynamic.

The invention can be utilized in an ex situ remediation scheme and to aid in design/construction of a remediation system.

BRIEF DESCRIPTION OF THE DRAWING FIGURES

FIG. 3 is a schematic diagram of the major components of the exemplary remediation system showing data exchange with the monitoring and decision center.

DETAILED DESCRIPTION OF EXEMPLARY EMBODIMENTS

Figure 1:
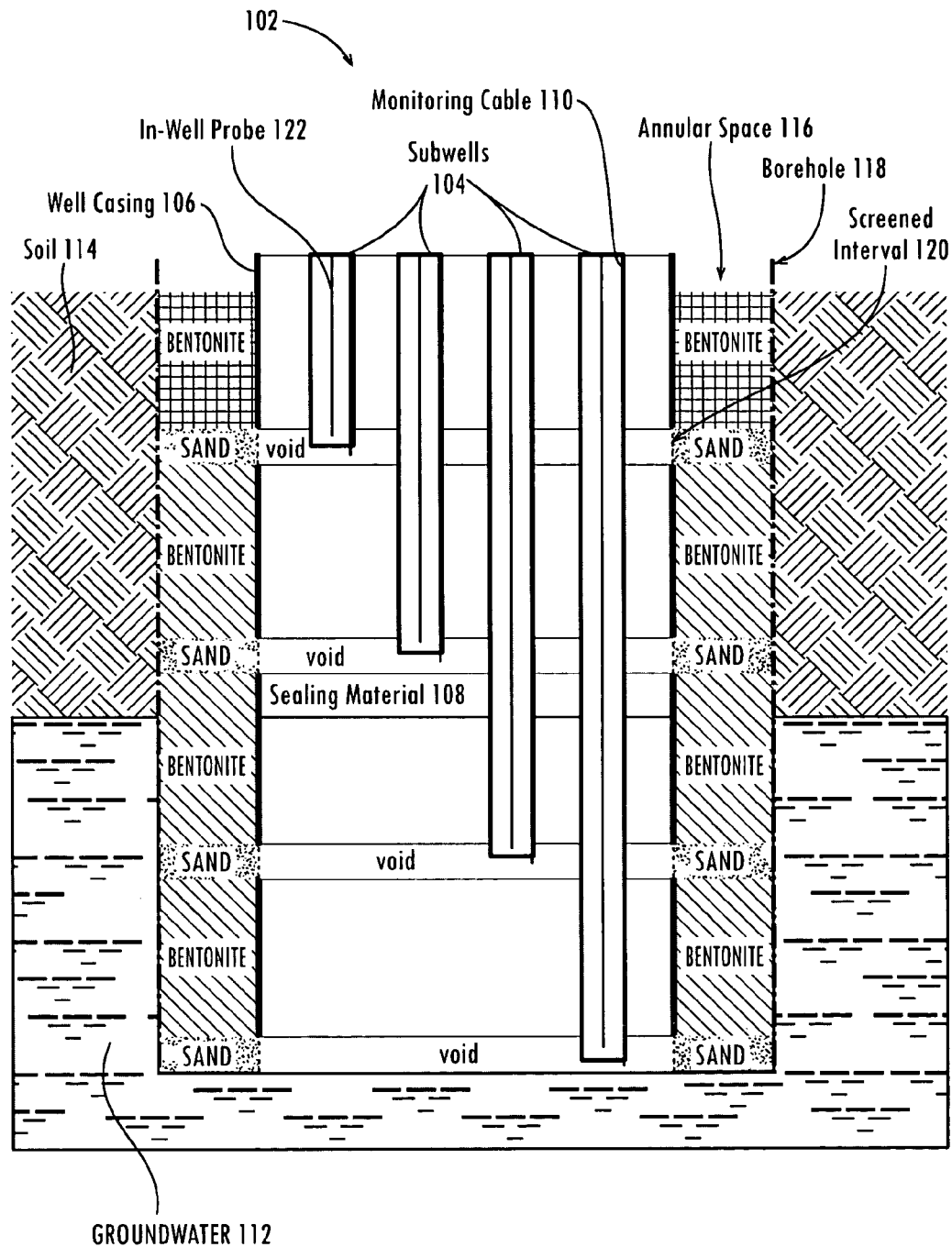
FIG. 1 is a cross-sectional view of a universal well according to an exemplary embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise.

As used herein "motive force" indicates any action that can add or remove matter from the area to be remediated.

As used herein "influence" indicates any change in conditions (e.g., measure of success or failure), which can be based on biological, chemical, geophysical, and other factors related to currently available or future sensors and equipment.

Referring to the drawing figures, wherein like reference numerals represent like parts throughout the several views, FIGS. 1–4 show a system for dynamic remediation of soil and groundwater according to an exemplary embodiment of the present invention. The system includes at least one wells, a motive force delivery system for use with the wells, and a monitoring and data processing center (a control system) for use with the motive force delivery system. The monitoring and processing center receives feedback from the wells and operates the motive force delivery system to control injection in and/or extraction from the wells. In this way, the remediation system can be dynamically tailored to the dynamic conditions at the project site.

FIG. 1 shows an exemplary embodiment of one of the wells 102. The exemplary well 102 is universal and comprises multiple smaller diameter pipes 104 or other casings that are installed inside of a larger diameter pipe 106 or other casing and are fixed into place using a sealing material 108. A monitoring cable 110 can be used as a part of data collection. For purposes of clarity of this discussion, the smaller diameter pipes 104 are referred to as subwells, the larger diameter pipe 106 is referred to as the well casing, and the entire device comprising the small diameter pipes, the larger diameter pipes, the sealing material and the monitoring cable is referred to as the universal well 102. Each subwell 104 can function as a traditional prior art monitoring well, as a well in which positive pressure is utilized, as a well in which negative pressure is utilized, as a monitoring point used in a feedback fashion with the monitoring cable 110 for determining geophysical or other parameters, or for a combination of these functions.

The number and location of wells 102 used in a particular environmental remediation project is based on hydrogeologic conditions and project goals. If desired, a number of wells of a similar or different type can be used in the project. For example, the project can include some non-universal wells dedicated for and selectively positioned for a particular one of the mentioned functions. The network can also include traditional monitoring wells that can be equipped with devices to measure parameters. A combination of multiple motive forces can typically produce better dispersion of the injected/extracted material, providing better coverage and more effective remediation. The network of independently controlled wells permits the maximum mass removal by going to the area with most impact first and also prevents undue spreading of contamination. In addition, the universal well(s) 102 can be utilized throughout the life of the environmental remediation project, or only during part of the project if the dynamic feedback indicates certain of the wells are no longer needed.

Installation of wells 102 (and equipment) can occur iteratively during the life of a project using the current invention. For example, after an initial design (with well(s)) is installed, the monitoring feedback of the system (as described further below) can be used to determine the number, location, and pumping rate of additional wells (and equipment) in addition to operating the motive force delivery system.

In order to facilitate the description of the universal well 102, a general depiction of the subsurface within the water (groundwater) table (saturated zone) 112 and within the dry soil 114 (also referred to as the vadose zone) is shown in FIG. 1. The subsurface within the groundwater 112 generally consists of solid matter (soil or rock) with groundwater (and nominal/negligible volumes of gases) in the pore spaces. In a typical environmental remediation project, the groundwater 112 may be contaminated with dissolved contaminants or free product that attach to (adsorb to) the saturated soil/rock. In a typical environmental remediation project, the vadose zone 114 may be contaminated with dissolved contaminants or free product that attach to (adsorb to) the soil. Also, contaminated vapors can be present in the void spaces of the vadose zone. The typical goal of the environmental remediation project is to lessen or eliminate the contaminated soil and/or groundwater.

In the exemplary universal well 102 shown in FIG. 1, there are four subwells 104, two of which terminate in the vadose zone 114 and two of which terminate in the groundwater 112. The vertical termination (bottom) of the subwells 104 and the number of subwells 104 used in each universal well 102 is based on hydrogeologic conditions and project goals and will typically be variable in universal wells 102 used for remediation. The different termination points allow discrete monitoring of soil void space or groundwater and discrete motive force application at varying vertical depths at the same approximate horizontal location within the subsurface. The monitoring can occur either during the application of motive force directly to the subwell 104, or when the well is being influenced by applications of motive force from other subwells 104, or when the subsurface in the vicinity of the well is in a static state.

The construction of the universal well 102 and the well completion in the annular space 116 of the borehole 118 will comprise the addition of materials such as sand and bentonite. For universal 102 (or injection-only or extraction-only wells), these or other materials are added in a manner that enables injection into or extraction from the subwells 104. For example, the annular space 116 (between the outer casing 106 and the borehole 118) of the borehole 118 that is "coincident" with the screened areas 120 of the outer casing 106 may be filled with sand. The annular space 116 of the borehole 118 that is coincident with the solid portions of the outer casing 106 will be grouted to prevent short-circuiting of injected or extracted material upward or downward within the borehole 118.

The screened intervals 120 of the well casing 106 will generally coincide with the bottoms of each subwell 104. Generally, the space inside the outer casing that is not in a screened interval is filled with a high-strength, high-durability material to create an airtight seal to prevent short-circuiting of injected or extracted material within the well. For example, sand may be placed in the annular space 116 in the screened intervals 120 and bentonite in the areas outside of the sealing material 108.

In addition to the monitoring cable 110, each subwell 104 can contain in-well probes 122 that are used for data collection for monitoring geophysical and/or other properties. For example, the probes 122 may be positioned within the interior of the subwell 104. The data is transmitted to a monitoring and decision center via a cable 110, wireless, or another appropriate method.

Figure 2:
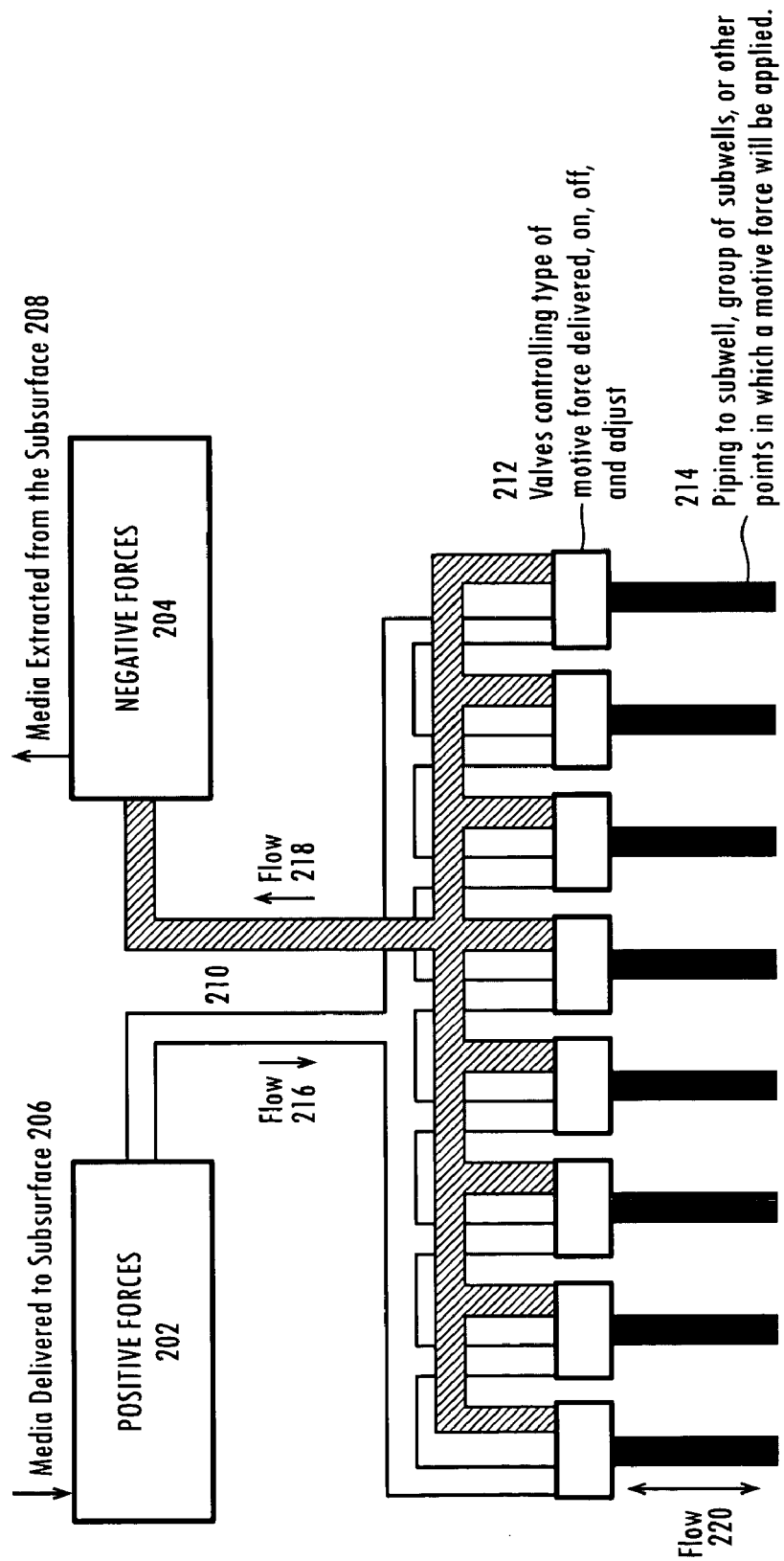
FIG. 2 is a block diagram of a motive force delivery system according to the exemplary embodiment for use with the universal well of FIG. 1.
Figure 7:
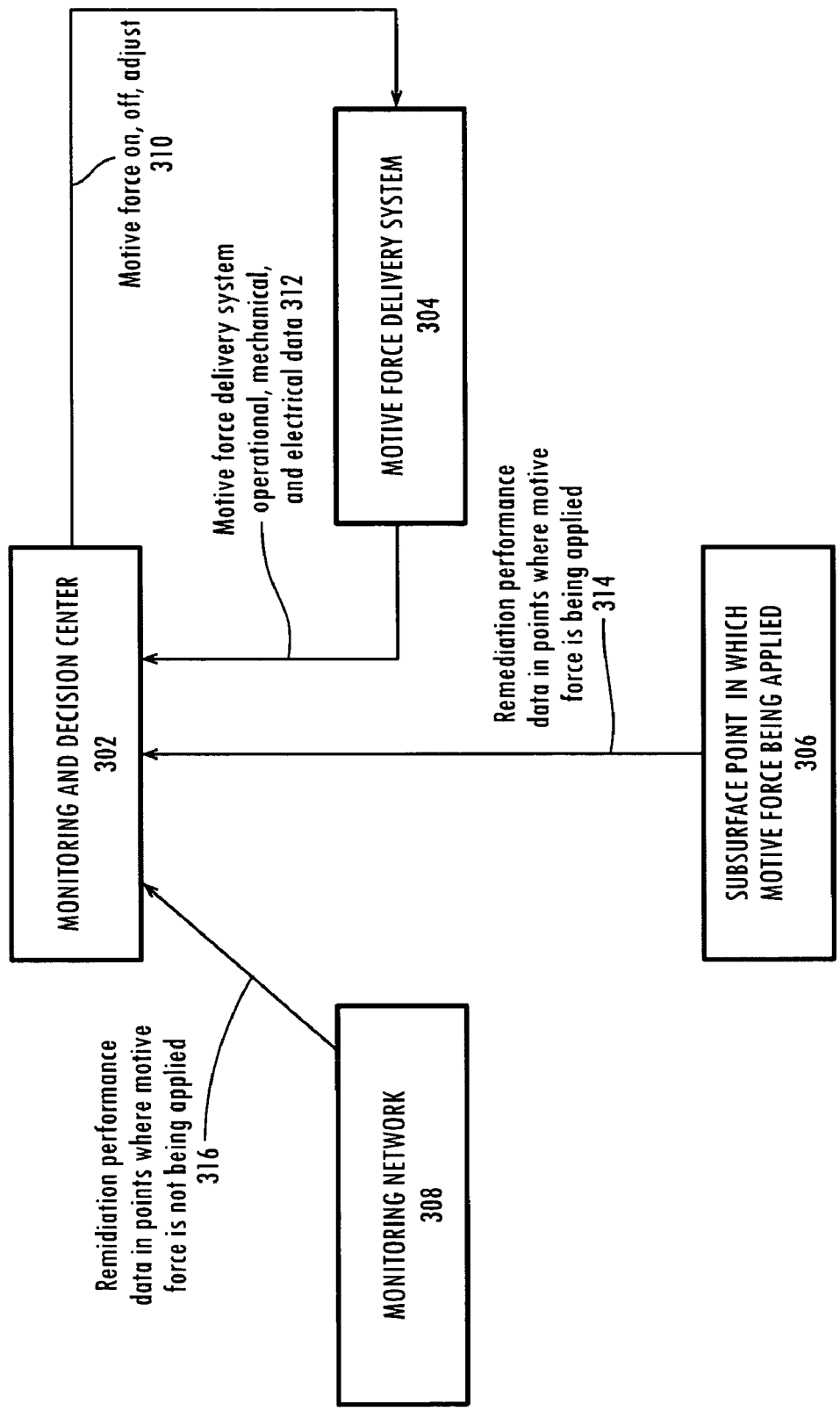

FIG. 2 shows an exemplary motive force delivery system. The motive force delivery system typically comprises equipment associated with remediation technologies such as pumps, compressors, and/or other conventional and/or future-developed equipment capable of delivering positive forces 202 and/or negative forces 204 to the subsurface.

Multiple sources of positive force 202 and multiple sources of negative force 204 can be used on a project. Positive forces 202 would generally include those that inject gases or liquids (and to a lesser extent solids) 206 into the subsurface through a subwell 104 or another type of subsurface point. Negative forces 204 would generally include those that extract gases or liquids (and to a lesser extent solids) 208 from the subsurface through subwells 104 or other subsurface points.

The motive force delivery system includes appropriate piping 210 and valving 212 to allow one or more positive forces 202 or one or more negative forces 204 to be delivered to each subwell 104, group of subwells, or other subsurface points within the well network. The motive force delivery system can also include valving 212 and controls to allow adjustment of motive forces by turning off an operating motive force, adjusting an operating motive force by partially opening or closing valving 212, and switching from a positive force 202 to a negative force 204 (or vice versa) within the same subwell 104 or group of subwells at multiple points within the subsurface. This could be accomplished at 212, by adding valves and controls in the piping between 212 and the motive forces 202 and 204, or by adding valves and controls between 212 and the subwell 104, group of subwells, or other subsurface points 214 in which a motive force is applied. Preferably, the motive force is delivered via piping 214 that connects the motive force delivery system to subwells 104 where remediation is required. Depending on the goals of the project, none, some, or all of the subwells 104 in the well network may be utilized for delivery of motive forces, and none, some, or all of the subwells 104 may have monitoring capability.

The flow line 216 during the positive motive force application (injection) is in the direction toward the subsurface, and the flow line 218 in the negative motive force application (extraction) is away from the wells. The direction of flow between the valves 212 and the subwell 104, group of subwells, or other points in which motive force is applied 214 is variable depending on whether positive 202 or negative 204 forces are being applied.

FIG. 3 shows an example of data exchange between the monitoring and decision center 302 and three typical remediation system components that deliver data to and/or receive data from the monitoring and decision center 302. In the exemplary remediation system shown, at a given point in time when the remediation system is operating and motive forces are being applied, there are three types of components that exchange data with the monitoring and decision center 302: the motive force delivery system 304, the subsurface points in which motive forces are being applied 306, and the subsurface points in which motive forces are not being applied 308. The diagram depicts the data exchange during a moment of operation of the exemplary embodiment in which motive forces within the motive force delivery system 304 are being applied to one or more subsurface points and monitoring is ongoing in the motive force delivery system 304, the subsurface points in which motive force is applied 306, and subsurface points in which motive force is not being applied 308. Within the group of subsurface points in which motive force is being applied 306, the type, number, and degree of motive forces that are applied to individual subsurface points are variable and are based on programmed criteria. Within the group of subsurface points in which motive force is not being applied 308, the subsurface at these points may be in a static state (not influenced by the motive force delivery system 304) or in a dynamic state (being influenced by the motive force delivery system 304).

The data exchange 310 typically comprises signals generated at any moment in time from the monitoring and decision center 302 that adjust the applied forces at any given point in the subsurface in accordance with programmed criteria in the monitoring and decision center 302. The adjustments made throughout the operation are based on the comparison of assimilated real-time monitoring data collected from 304, 306, and 308 to programmed criteria in the monitoring and decision center 302, as depicted in FIG. 4.

The data exchange 312 between the motive force delivery system 304 and the monitoring and decision center 302 typically comprises mechanical and electrical data associated with the operation of the motive forces as well as remediation performance data. Gages, probes, sensors, and/or other devices are used in the motive force delivery system 304 to collect data. Data is transferred to the monitoring and decision center 302 via cables, wireless systems, and/or other devices.

The data exchange in 314 and in 316 between the subsurface points and the monitoring and decision center 302 typically comprises remediation performance data. Monitoring cables 110 and in-well probes 122 are used in subsurface points 314 and 316 to collect remediation performance data. Gages, probes, sensors, and/or other devices between the subsurface points 314 and 316 and the valves controlling motive force 212 are used to collect data. Data is transferred to the monitoring and decision center 302 via cables, wireless systems, and/or other devices.

Figure 4:
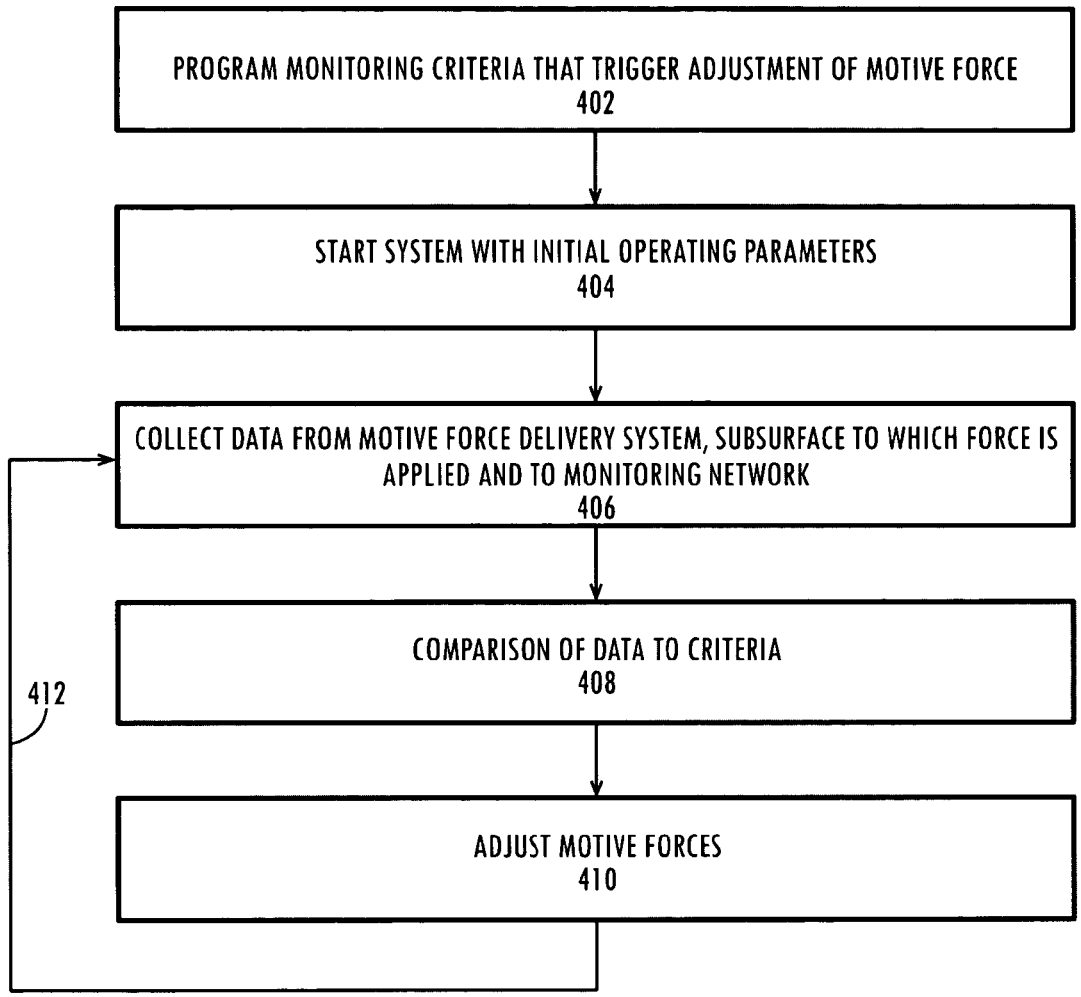
FIG. 4 is a flow diagram showing monitoring and decision center logic.

FIG. 4 shows an example of the basic logic that may be implemented in the monitoring and decision center 302. The monitoring and decision center 302 can include a central processing unit, one or more data storage devices, input and display devices, and/or other components which are known in the art for implementing control logic. Each sensor probe and/or other subsurface condition input device is wired or otherwise connected to the monitoring and decision center 302 for measuring and recording appropriate parameters. The motive force delivery system 304 and/or other output devices are connected to the monitoring and decision center 302 for control and operation in response to the input data. Other system components and control logic could be used, and the monitoring and decision center 302 and logic can be utilized with other devices such as horizontal wells, traditional monitoring wells, and/or other remediation wells. Preferably, the monitoring and decision center 302 is located on-site, though it could be remotely located and provided with wireless or another technology for communication.

Initially, at 402 criteria for monitoring data (e.g., data used to trigger adjustment of motive forces at each point in the subsurface) are programmed into the central processing unit. This programming can be modified at any point in the remediation project as project objectives or subsurface conditions change. The criteria are based on project goals. Examples of broad goals include: applying motive forces to affect more or a specific subsurface volume, minimizing undesirable effects caused by the application of the motive forces, minimizing equilibrium conditions in the subsurface, and maximizing safety.

An example of how more volume or a specific volume of the subsurface can be affected would include configuring the monitoring and decision center 302 and using sensors to detect indicators of influence at varying horizontal and vertical positions. Feedback in these locations is used in programmed logic that adjusts motive force application in an iterative fashion until the desired volume of subsurface is affected to the desired degree. This method can be used in conjunction with an iterative remediation well installation technique to optimize the remediation process.

An example of an undesirable effect caused by the application of the motive forces is that pore size preferential pathways (usually less than 1 millimeter) can be created in the subsurface by the application of motive forces. These preferential pathways can significantly reduce the area of flow and prevent effective distribution of the motive forces to the contaminated subsurface, thereby minimizing contaminant removal efficiency, since only a small volume of mass would be available for removal. The monitoring and decision center 302 can be configured and programmed to detect preferential pathways that develop after startup by incrementally and frequently measuring and controlling pressure or vacuum to prevent preferential pathways from developing to maximize remediation effectiveness.

Upon completion of the initial programming at 402, then at 404 the remediation system is started with initial operating parameters. Preferably, data collection 406 is continuous throughout the entire operation of the system. At any given moment of operation, data is collected from, for example, the motive force delivery system 304, the wells in which motive force is applied 306, and the wells in which there is not a motive force being applied 308. The data collected is transmitted to the monitoring and decision center 302, and at 408, is compared to the criteria initially established at 402 to determine what adjustments (if any) are required at 410 to meet the pre-established objectives. The data comparison step 408 can include, for instance, absolute readings (e.g., "if measured value equals preestablished value, then make this change"), differentials (e.g., "if previous reading versus current reading is more than preestablished value, then make this change"), and/or sequential (e.g., "reach equilibrium with this array of motive force application, then change to a different array").

When at 410 the programmed criteria necessitate adjustment, one or more of the following adjustments typically occur: 1) a currently inactive (no force being applied) subwell 104, group of subwells, other point in the subsurface, and/or motive force delivery system 304 component is adjusted to have a specified motive force applied at a specified default value; 2) a currently active (specific motive force being applied) subwell 104, group of subwells, other point in the subsurface, and/or motive force delivery system 304 component is adjusted with a different amount of the same specific motive force applied; 3) a currently active subwell 104, group of subwells, other point in the subsurface, and/or motive force delivery system 304 component is adjusted to a different motive force applied at a specified default value; and/or 4) a currently active subwell 104, group of subwells, other point in the subsurface, and/or motive force delivery system 304 component is adjusted by turning off. Following completion of a given adjustment, the comparison and adjustment continues in a feedback loop fashion at 412. A series of adjustments can be performed in a predetermined sequence for a specified subwell 104, group of subwells, other point in the subsurface, and/or motive force delivery system component. In this way, the system can be used dynamically and intelligently, for example, by applying motive forces, then monitoring the effect (which can be done while applying any motive forces or not), and then applying motive force better tailored to the then-current subsurface conditions.

While operational data is being gathered, repeating sequences of operational adjustments that meet broad project objectives can be programmed. For example, when operating in a manner that minimizes equilibrium, criteria would typically be programmed to adjust the flowpath by activating different motive forces and/or by applying motive forces at different locations. The number and nature of the flowpath adjustments can be defined in the programming so that each flow path adjustment affects a different portion of contamination or achieves an operational goal, thereby optimizing remediation effectiveness.

As mentioned above, the system/method of the present invention can be used to aid in design/construction of the remediation system over time. An initial design and protocol can be implemented with at least one well, motive force delivery system, and a monitoring and decision center. As monitoring data is gathered and feedback used to adjust the initial design and protocol, this information can also be used to further design (or iteratively design and construct) the system. In this regard a "full" remediation need not be constructed at the beginning of a project. Iterative installation of well, controls, monitoring equipment, and piping can be accomplished, thus using the appropriate resources at the appropriate time. Using this method, the operational data dictates the arrival at the "correct" number and type of wells, system controls, piping, and other equipment. Alternatively, the data can dictate change in technology to be applied at the site.

The system/method of the present invention can be used in ex situ remediation processes as well as in situ processes. In one example, an ex situ soil pile can have a system of piping in, on, and/or under the soil pile. The ex situ remediation site can comprise various monitoring devices. The data from the monitoring devices can be in communication with a motive force delivery system, and a monitoring and decision center. The feedback system can control the motive force delivered to the piping (as well as dictate changes in design and/or technology). Alternative embodiments for an ex situ remediation process are within the skill of one of ordinary skill in the art.

We claim:

1. A method for remediating a contaminated soil and/or groundwater site using an apparatus for applying a motive force to the subsurface of the site, the method comprising the steps of:
    (a) assessing the environmental damage at the site;
    (b) establishing an initial remediation design and protocol which includes project objectives and program monitoring criteria;
    (c) applying at least one initial motive force to the site according to the initial remediation design and/or protocol using the apparatus for applying the motive force;
    (d) monitoring the assimilated real-time horizontal and vertical remediation performance effect on the site resulting from the application of the at least one initial motive force;
    (e) comparing the real-time effect to the project objectives and program monitoring criteria;
    (f) modifying the remediation design and/or protocol in accordance with the project objectives and program monitoring criteria to improve the performance of the remediation using operational information gleaned from the monitoring of the site;
    (g) applying at least one subsequent motive force according to the modified remediation design and/or protocol using the apparatus for applying the motive force; and
    (h) repeating steps (d), (e), (f), and (g) in a more or less continuous fashion until the remediation is complete.

2. The method of claim 1 wherein the repeating step is carried out periodically over time.

3. The method of claim 1 wherein the repeating step is carried out continuously over time.

4. The method of claim 1 wherein the monitoring is done automatically via automation.

5. The method of claim 1 wherein the remediation is carried out using a plurality of remediation wells and the remediation protocol selectively uses one or more of the remediation wells, with the step of modifying the remediation protocol comprising modifying which remediation wells are utilized as needed to improve performance.

6. The method of claim 1 wherein a plurality of remediation wells are employed, with the modifying step comprising dynamically deciding which remediation wells should be employed, and to what extent, in order to effect the remediation of the site in a quick and cost-effective manner.

7. The method of claim 1 wherein the modifying step comprises modifying the remediation protocol to minimize undesirable effects.

8. The method of claim 1 wherein a number of multi-purpose wells are employed, with the multi-purpose wells being capable of both applying a motive force and monitoring the effect of that applied motive force.

9. The method of claim 1 wherein the initial remediation protocol is initially based on a plurality of project-specific chemical, geologic, and/or hydrogeologic parameters and wherein the parameters are established through assessment, research of similar conditions, pilot testing, or on-going remediation operations.

10. The method of claim 1 wherein the monitoring step comprises monitoring the effect of a motive force and properties of the subsurface conditions at various vertical depths within the subsurface of the site.

11. The method of claim 5 wherein the wells are universal wells.

\* \* \* \* \*